United States Patent
Wu et al.

(10) Patent No.: US 8,189,459 B2
(45) Date of Patent: May 29, 2012

(54) METHOD AND SYSTEM FOR GUIDING PACKET DATA PROTOCOL ACTIVATION

(75) Inventors: Xuenong Wu, Guangdong (CN); Xiaoqin Hong, Guangdong (CN); Bo Shu, Guangdong (CN); Wu Zhao, Guangdong (CN); Chaohui Chen, Guangdong (CN); Xiuyun Chen, Guangdon (CN); Weidong Chen, Guangdong (CN); Xiaonian Mai, Guangdong (CN); Yuqing Xia, Guangdong (CN); Yue Dong, Guangdong (CN); Xunlu Huang, Guangdon (CN); Xuxin Wu, Guangdon (CN)

(73) Assignee: China Mobile Group Guangdong Co., Ltd., Guangdong (CN)

( * ) Notice: Subject to any disclaimer, the term of this patent is extended or adjusted under 35 U.S.C. 154(b) by 168 days.

(21) Appl. No.: 12/682,593

(22) PCT Filed: Oct. 30, 2008

(86) PCT No.: PCT/CN2008/072885
§ 371 (c)(1),
(2), (4) Date: Jun. 8, 2010

(87) PCT Pub. No.: WO2009/071013
PCT Pub. Date: Jun. 11, 2009

(65) Prior Publication Data
US 2010/0260037 A1    Oct. 14, 2010

(30) Foreign Application Priority Data
Nov. 9, 2007 (CN) .......................... 2007 1 0031314

(51) Int. Cl.
*H04J 1/16* (2006.01)
(52) U.S. Cl. .......................... 370/216; 370/349; 370/338
(58) Field of Classification Search .................. 370/389, 370/328, 216, 242, 338, 349, 420, 426
See application file for complete search history.

(56) References Cited

U.S. PATENT DOCUMENTS

| | | | | |
|---|---|---|---|---|
| 6,970,694 | B2 * | 11/2005 | Shaheen | 455/414.1 |
| 7,054,323 | B2 * | 5/2006 | Viola et al. | 370/401 |
| 7,660,584 | B2 * | 2/2010 | Maxwell et al. | 455/436 |
| 7,761,913 | B2 * | 7/2010 | Grandmaitre et al. | 726/12 |
| 2003/0208628 | A1 * | 11/2003 | Karjanlahti | 709/249 |

FOREIGN PATENT DOCUMENTS

| | | |
|---|---|---|
| CN | 1568050 A | 1/2005 |
| CN | 1722867 A | 1/2006 |
| CN | 1809052 A | 7/2006 |
| CN | 1842090 A | 10/2006 |
| CN | 101159731 A | 4/2008 |

OTHER PUBLICATIONS

ISR for PCT/CN2008/072885 dated Feb. 5, 2009.

* cited by examiner

*Primary Examiner* — Brenda H Pham
(74) *Attorney, Agent, or Firm* — Lowe Hauptman Ham & Berner LLP

(57) ABSTRACT

The invention discloses a method and system for guiding a packet data protocol activation. The method includes determining whether a packet data protocol is activated and if the determination result indicates that the packet data protocol is not activated because of including a wrong service access point name, analyzing service access point name information causing the packet data protocol not activated; introducing in an associating database for associating service access point name reason information causing the packet data protocol not activated and a guide information for properly setting the service access point name; inquiring the associating database based on the service access point name reason information obtained by the analyzing and obtaining the guide information for guiding a user to properly set the service access point name; and transmitting the guide information for guiding the user to properly set the service access point name to the user side. According to the method and system of the invention, the guide information may be generated automatically before the activation of the protocol to thereby reduce the maintenance workload for these functions and to thereby properly guide the user to have the related services provisioned and accessed.

15 Claims, 6 Drawing Sheets

METHOD AND SYSTEM FOR GUIDING PACKET DATA PROTOCOL ACTIVATION

RELATED APPLICATIONS

The present application is National Phase of PCT/CN2008/072885 filed Oct. 30, 2008, and claims priority from, Chinese Application Number 200710031314.8 filed Nov. 9, 2007, the disclosures of which are hereby incorporated by reference herein in their entirety.

FIELD OF THE INVENTION

This invention relates to a wireless communication field, and more particularly to a method for guiding packet data protocol activation and its corresponding system.

DESCRIPTION OF THE PRIOR ART

General Packet Radio Service (GPRS) is taken as an example to illustrate systems of the related art. GPRS is a kind of wireless packet switching technology based on Global System for Mobile Communication (GSM), which provides end-to-end wide area Internet Protocol (IP) connections. Simply speaking, GPRS is a kind of high speed data processing technology, which transmits data with a packet switching method and can provide users with high speed data services in a mobile environment and with functions of email transmission and reception and Internet browsing. As a new GSM data service, GPRS primarily provides a connection between a mobile user and a remote data network, to thereby provide the mobile user with a high speed wireless IP and X.25 services.

In order to realize GPRS, new network interfaces and communication protocols should be introduced in the traditional GSM network. Currently, the GPRS network has introduced GPRS Supporting Node (GSN) and a mobile station for the GPRS system must be a GPRS mobile station or a GSM/GPRS dual mode mobile station. GSN is the most important network node in the GPRS network and may accomplish data transmission and format conversion between a mobile station and various data networks. GSN may be an independent device similar to a router, and also may be integrated with Mobile Switching Center (MSC) of the GSM, which includes the following two forms of Gateway GSN (GGSN) and Serving GSN (SGSN).

Gateway GSN (GGSN) primarily functions as a gateway and can be connected to various data networks, such as Integrated Services Digital Network (ISDN), Public Switched Telecommunications Network (PSTN), Local Access Network (LAN) and so on. GGSN may convert the protocol of the GPRS data packets in the GSM network, thereby to transmit the GPRS data packets to a remote Transmission Control Protocol/Internet Protocol (TCP/IP) network or X.25 network.

Serving GSN (SGSN) primarily functions to record the current location information of the mobile station and accomplish data transmission and reception between the mobile station and the GGSN.

Currently, since the GPRS service develops fast and the number of users increases rapidly, the daily handling capacity of the GPRS service provisioning requests increases steadily. However, during the process when a mobile user requests the GPRS service provisioning, the main reason why the Packet Data Protocol (PDP) is not activated is that the Access Point Name (APN) is not properly set. Therefore, the users need to be guided to properly set the APN so that they can correctly have the GPRS service provided.

Currently, according to the related art, the expansibility of the system which uses the setting operation to guide the user to properly set the APN is bad. Therefore, when the architecture of the GPRS network becomes complicated steadily, the workload for the engineer to maintain these functions of the GPRS system is increased.

SUMMARY OF THE INVENTION

An objective of this invention is to provide a method and its corresponding system for guiding packet data protocol activation. Guide information may be generated automatically before the activation of the protocol to thereby reduce the maintenance workload for these functions and to thereby properly guide the user to have the related services provisioned and accessed.

In order to solve the above problem, this invention provides a method for guiding a packet data protocol activation, including: determining whether a packet data protocol is activated and if the determination result indicates that the packet data protocol is not activated because of including a wrong service access point name, analyzing service access point name information causing the packet data protocol not activated; introducing in an associating database for associating service access point name reason information causing the packet data protocol not activated with guide information for properly setting the service access point name; inquiring the associating database based on the service access point name reason information obtained by the analyzing and obtaining the guide information for guiding a user to properly set the service access point name; and transmitting the guide information for guiding the user to properly set the service access point name to the user side.

According to the above technical solution, if the determination result indicates that the packet data protocol is not activated, before analyzing the service access name information causing the packet data protocol not activated, the method may further comprise a step of listening to a signaling carrying the service access point name information causing the packet data protocol not activated.

According to the above technical solution, analyzing the service access name information causing the packet data protocol not activated comprises: obtaining the service access name reason information causing the packet data protocol not activated and mobile station user information by analyzing the GTP signaling.

According to the above technical solution, the method may further include: introducing in a carrying mode set of the guide information; and transmitting the guide information for guiding the user to properly set the service access point name to the user side by a carrying mode of the guide information.

According to the above technical solution, the method may further include: analyzing the GTP signaling to obtain alarm information indicating the packet data protocol is not activated; introducing in a carrying mode set of the alarm information; and transmitting the alarm information to a management side by a carrying mode of the alarm information.

According to the above technical solution, the carrying mode of the guide information is one of a short message mode, an Over the Air mode, a voice communication mode and an email mode.

According to the above technical solution, the carrying mode of the alarm information is one of a short message mode, an Over the Air mode, a voice communication mode and an email mode.

The invention also provides a system for guiding a packet data protocol activation, including: an access gateway, for generating guide information for guiding a user to properly set a service access point name to thereby control a transmission of the guide information to a user side before an activation of a packet data protocol.

According to the above technical solution of the system, the access gateway may further includes: a simulating GGSN server, for obtaining an activation request signaling and when determining the packet data protocol is not activated, for outputting service access point name information causing the packet data protocol not activated; a service engine server, for generating the guide information for guiding the user to properly set the service access point name by analyzing the service access point name information; and a transmission control device, for controlling the transmission of the guide information to the user side.

According to the above technical solution of the system, the simulating GGSN server includes a listening module, for listening to a GTP signaling carrying the service access point name information causing the packet data protocol not activated.

According to the above technical solution of the system, the service engine server may comprise: a storage unit, for storing an associating database for associating the service access point name reason information causing the packet data protocol not activated with the guide information; an analyzing unit, for obtaining the service access name reason information causing the packet data protocol not activated and mobile station user information by analyzing the GTP signaling; and an inquiring unit, for inquiring the associating database based on the service access point name reason information and the mobile station user information obtained by the analyzing unit to thereby obtain the guide information for guiding the user to properly set the service access point name.

According to the above technical solution of the system, the system may further include at least one of the following servers: an alarm server, for configuring a carrying mode of alarm information before the transmission control device controls the transmission of the alarm information to a management side; a guide server, for configuring a carrying mode of the guide information before the transmission control device controls the transmission of the guide information to the user side; a control station server, for providing a human-machine interactive interface for guiding the packet data protocol activation for the system; a monitoring server, for monitoring system performances of respective devices in the system; and a database server, connected with the respective devices in the system and for transferring information streams of the respective devices.

According to the method and system for guiding a packet data protocol activation, the service APN information causing the packet data protocol not activated is analyzed before the activation of the packet data protocol and the guide information for guiding the user to properly set the service APN information obtained by the analyzing is transmitted to the user, to thereby guide the user to properly set the service APN information, to have the related service provisioned, to effectively reduce the manual maintenance workload for these functions of the system and to improve the communication service efficiency and quality.

DETAILED DESCRIPTION OF THE PREFERRED EMBODIMENTS

An embodiment of the invention takes the GPRS system as an example, which provides a method and system for guiding the PDP activation. According to this method and system, when the PDP is not activated, the wrong APN setting information causing the PDP not activated is analyzed, the guiding information for guiding the user to properly set the APN is obtained and output to the user, to thereby properly guide the user to have the GPRS service accessed and provisioned.

The embodiment of the invention will be described in detail with reference to the accompanied drawings.

Figure 1:
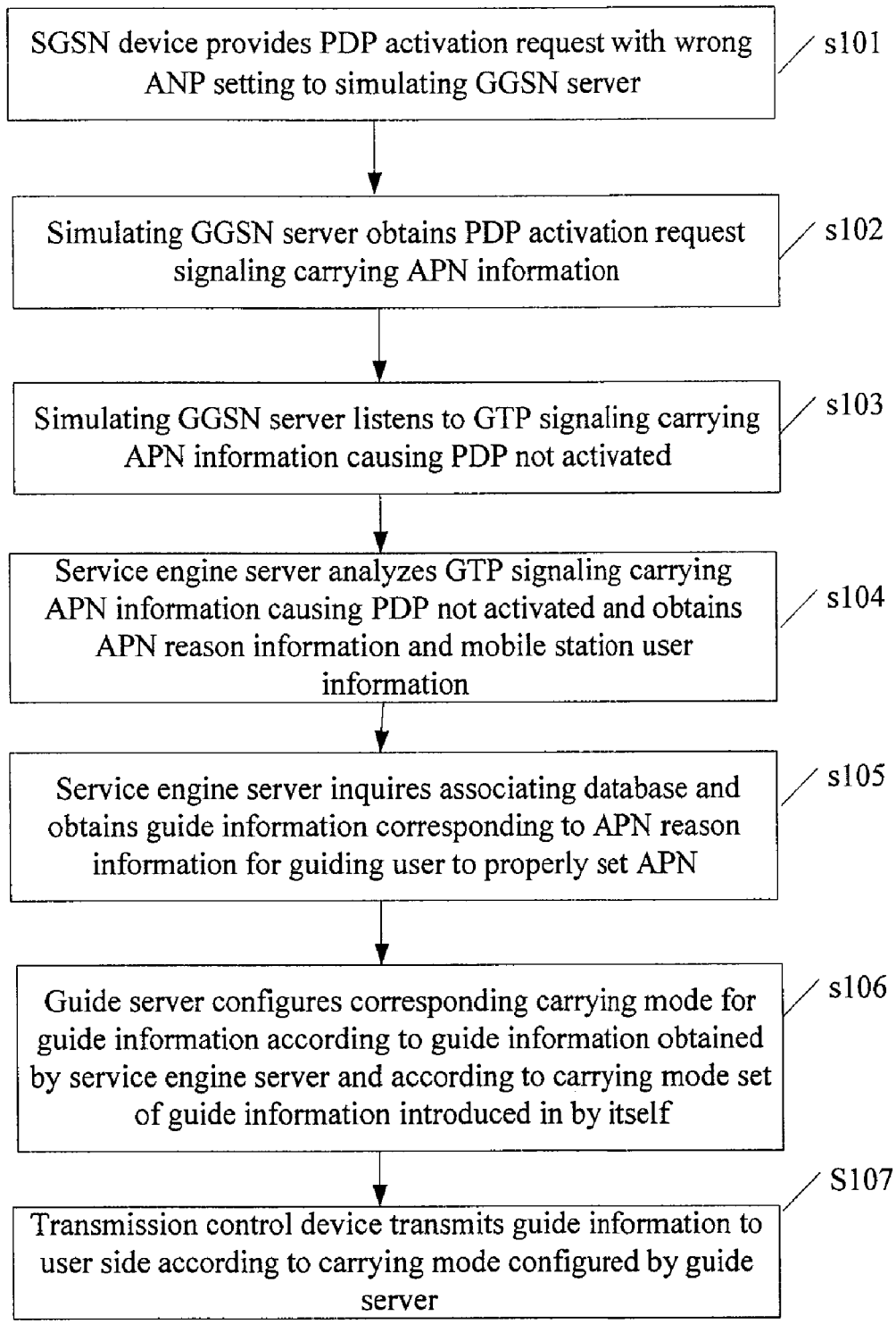
FIG. 1 is a schematic diagram showing a method for guiding a packet data protocol activation according to an embodiment of the invention.

FIG. 1 is a schematic diagram showing a method for guiding the PDP activation according to the embodiment of the invention. Prior to the performance of the PDP activation method, the network registration parameters of the Domain Name System (DNS) and of the guiding target user (group) of the GPRS system in the Home Location Register (HLR) are configured (HLR is a database storing local users' location information), so that the PDP activation request with a wrong APN setting may be provided to the simulating GGSN server through the SGSN device to thereby make the SGSN device and the simulating GGSN server to perform judge together as to the reason why the PDP is not activated. Referring to FIG. 1, the method for guiding the PDP activation mainly includes the following steps.

In step s101, the SGSN device provides the PDP activation request with the wrong APN setting to the simulating GGSN server.

In step s102, the simulating GGSN server obtains the signaling carrying the PDP activation request with the APN information.

In step s103, the simulating GGSN server listens to the GTP signaling carrying the PDP activation request with the APN information. When the GGSN server has listened that there is the GTP signaling carrying the PDP activation request, it responds with that this PDP activation request is refused. Since the GTP tunneling protocol has GTP version0 (GTPv0) and GTP version 1 (GTPv1), the simulating GGSN server listens to the GTP signaling whose PDP is not activated by using the method shown in FIG. 2, which includes the following steps.

In step s201, configuration parameters of GTPv0 and GTPv1 are read.

In step s202, listening service threads of GTPv0 and GTPv1 are initiated.

In step s203, the listening is blocked and the GTP signaling is waited to be received.

In step s204, when the GTP signaling is received, a flag byte in the GTP signaling is extracted and this flag byte may be used to judge the version of the GTP signaling.

In step s205, the version of the GTP signaling is determined and the following steps will be performed according to different GTP signaling versions (GTPv0 or GTPv1).

In step s206, the signaling head is extracted.

In step s207, the signaling body is extracted.

In step s208, the GTPv0 or GTPv1 response signaling is constituted.

In step s209, a reason code is set, wherein the reason code may indicate that the PDP request is refused.

In step s210, a GTP response signaling that the PDP activation request is refused is transmitted.

In step s211, the GTP request signaling whose PDP is not activated is stored.

Figure 2:
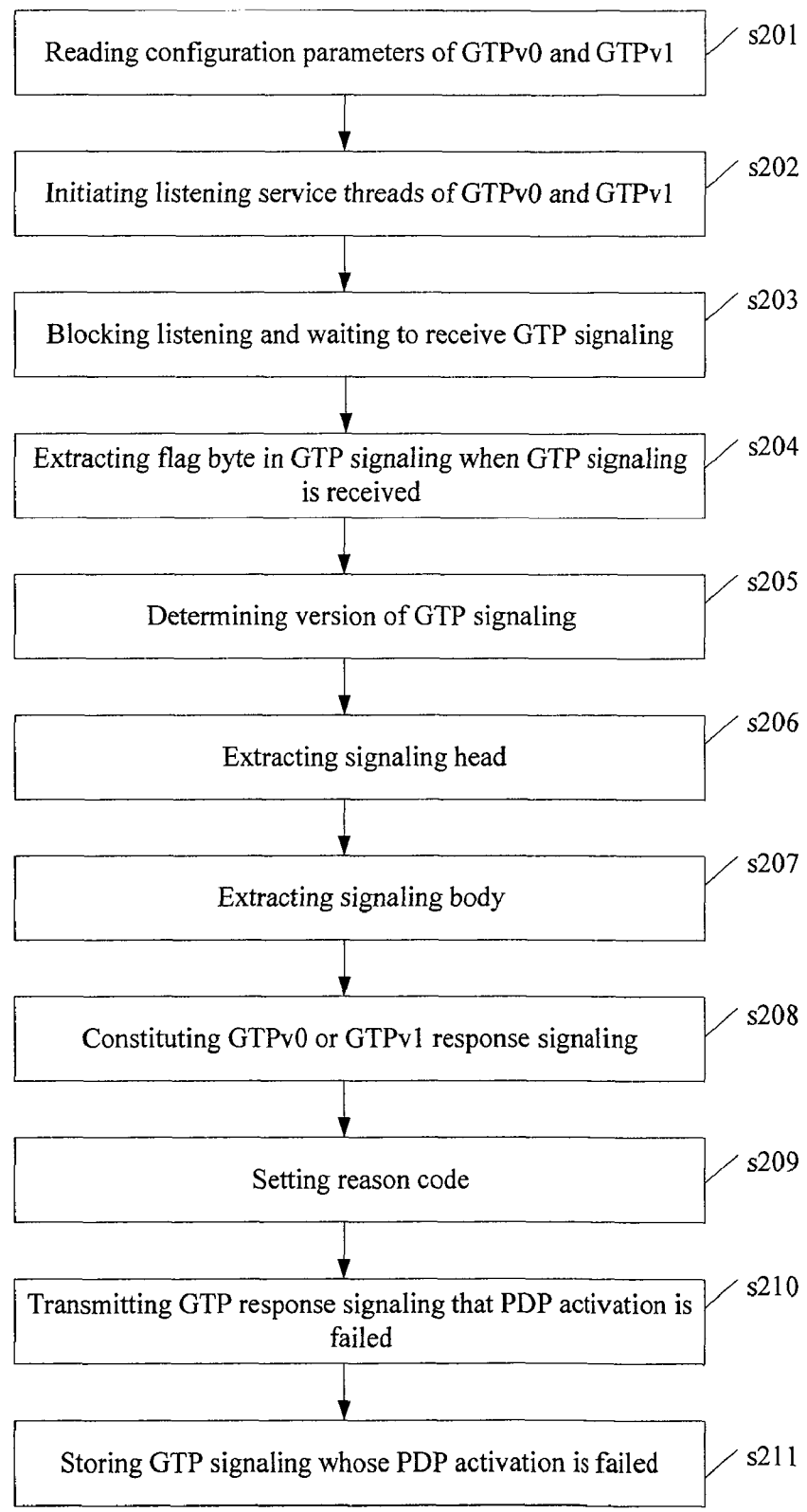
FIG. 2 is schematic diagram showing a method for listening to a GTP signaling whose packet data protocol is not activated by a simulating GGSN server according to an embodiment of the invention.

In addition, when the listening service thread of the GTP signaling needs to be detected its survival regularly, the method in the above FIG. 2 can include the following steps: detecting whether the listening service thread of the GTP signaling is surviving and when the detecting result shows that the listening service thread of the GTP signaling is surviving, causing the detecting thread enter a sleeping state and wait the regular detection to be awaken, and when the detecting result shows that the listening service thread of the GTP signaling is not surviving, initiating the listening service thread to thereby guarantee the listening service thread to work properly.

In step s104, the service engine server analyzes the GTP signaling carrying the APN information causing the PDP not activated and obtains APN reason information and mobile station user information, wherein the APN reason information that the PDP is not activated and the guide information for guiding the user to properly set the APN to perform the PDP activation are introduced in the service engine server and the APN reason information and the guide information constitute an associating database.

In step s105, the service engine server inquires the associating database and obtains the guide information corresponding to the APN reason information for guiding the user to properly set the APN.

Figure 3:
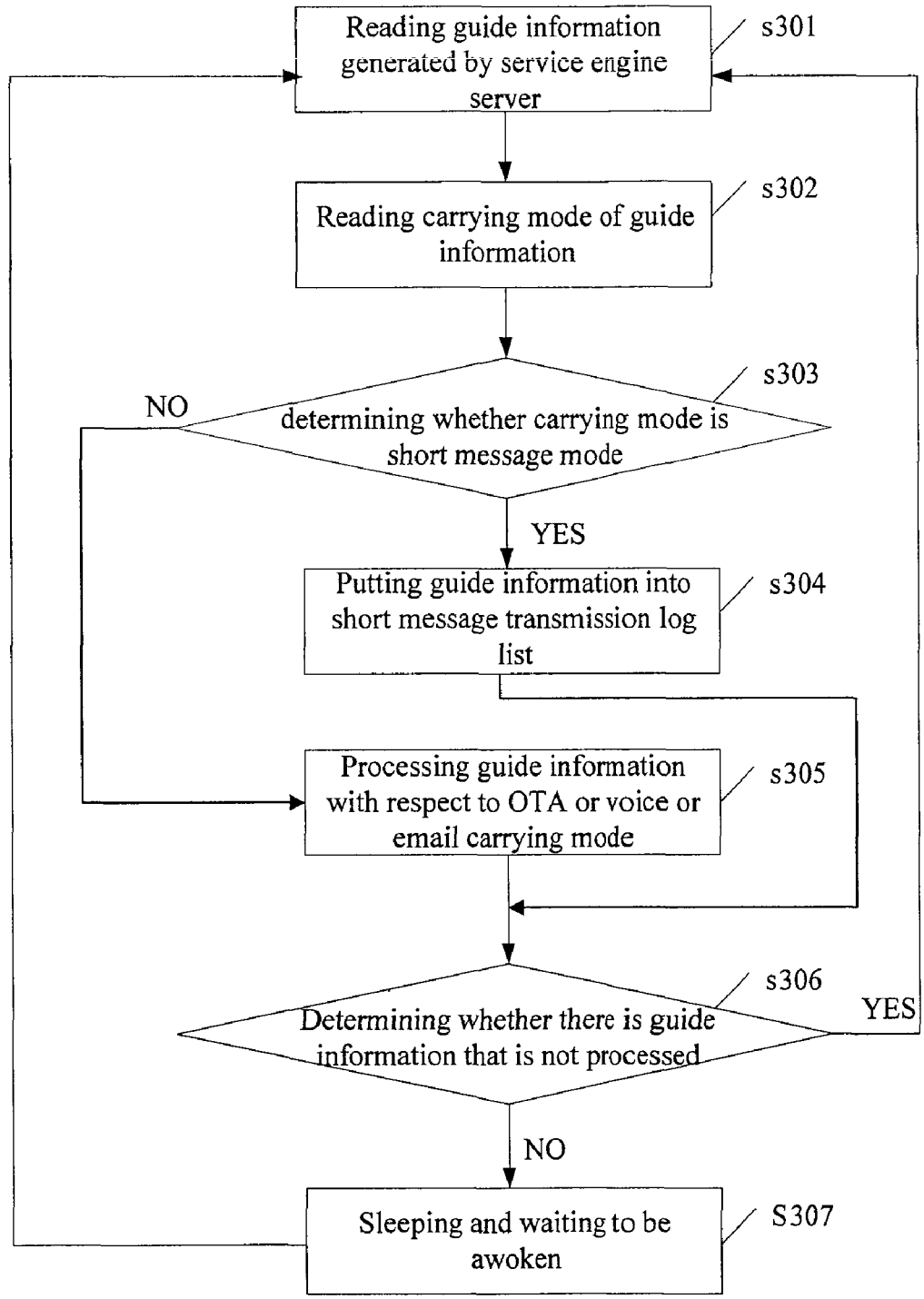
FIG. 3 is a schematic diagram showing a processing method of a guide server according to an embodiment of the invention.

In step s106, the guide server configures a corresponding carrying mode for the guide information according to the guide information obtained by the service engine server and according to a carrying mode set of the guide information introduced therein, wherein the carrying modes include a short message mode and Over-the-air (OTA) mode (i.e., OTA technology, which is a technology by which the SIM card data and the application is managed remotely through the air interface of the mobile communication (GSM or CDMA), and the air interface may take the form of WAP, GPRS, CDMA1x and short message technology), voice communication mode, email mode etc., and the optimal one can be selected according to whether the adaptation is easy. A specific processing flow of the guide server is shown in FIG. 3 and mainly includes the following steps.

In step s301, the guide information generated by the service engine server is read.

In step s302, the carrying mode of the guide information is read.

In step s303, it is determined whether the carrying mode is the short message mode and if yes, step s304 is performed; otherwise, step s305 is performed.

In step s304, the guide information is put into a short message transmission log list.

In step s305, the guide information is processed with respect to the OTA or voice or email carrying mode.

In step s306, it is determined whether there is guide information that is not processed and if yes, step s301 is performed; otherwise, step s307 is performed.

In step s307, the guide server is in the sleeping state and waits to be awoken to perform step s301.

In step s107, a transmission control device transmits the guide information to the user side according to the carrying mode configured by the guide server so as to help the user to properly set the APN and achieve the application of the GPRS service.

In addition, there may be the following three points of complementation.

1. When a manager or a management device at a management side needs to obtain alarm information that the PDP is not activated, it may analyze the GTP signaling whose PDP is not activated in step s103 and obtain the alarm information indicating the PDP is not activated so as to transmit the obtained alarm information to the manager or the management device through the carrying modes such as the short message, email or voice communication. The processing flow which can be added in the service engine service is shown in FIG. 4; an alarm server can be also added in the service engine service and the processing flow of the alarm server is shown in FIG. 5.

Figure 4:
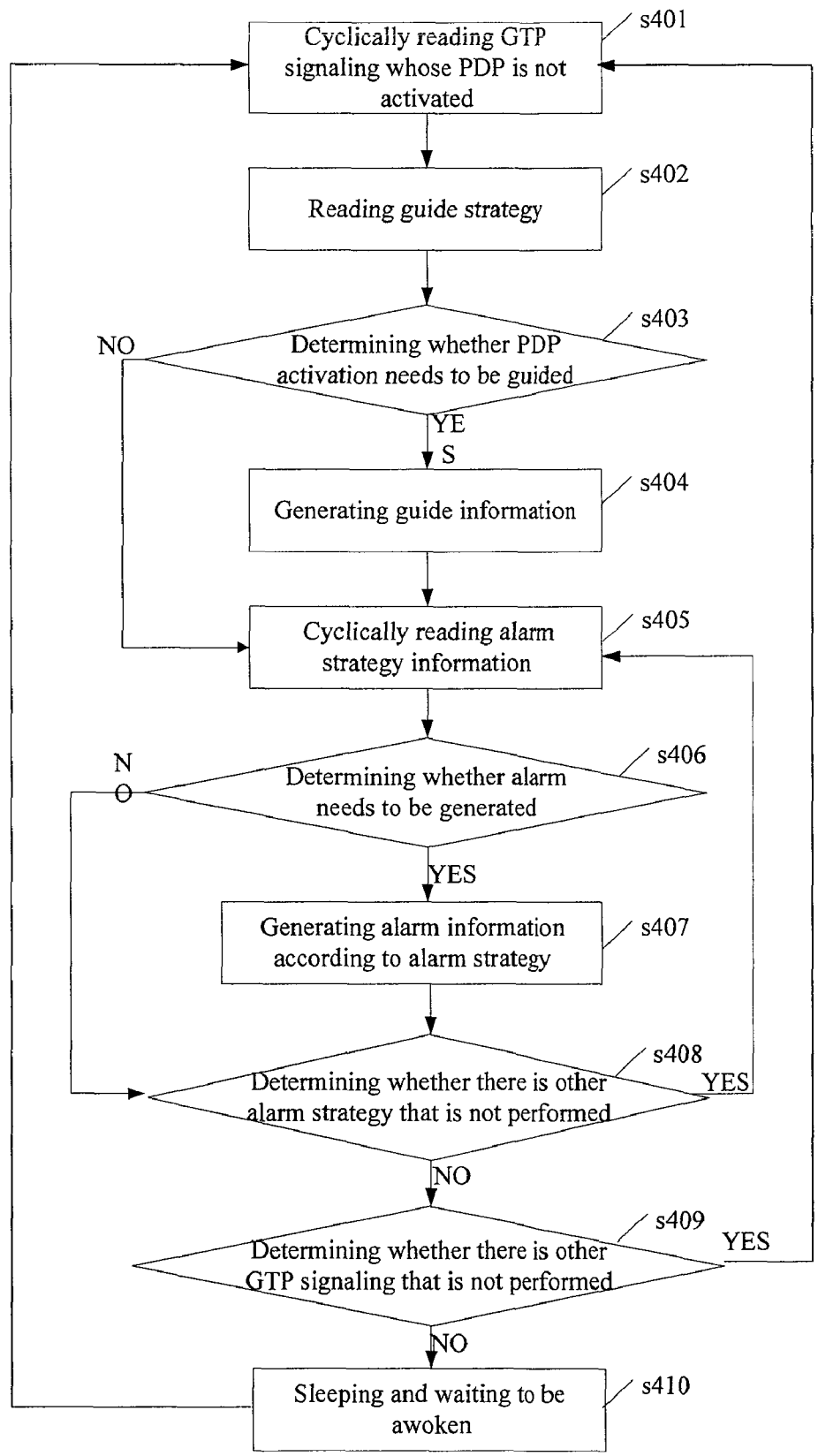
FIG. 4 is a schematic diagram showing a processing method of a service engine server according an embodiment of the invention.
Figure 5:
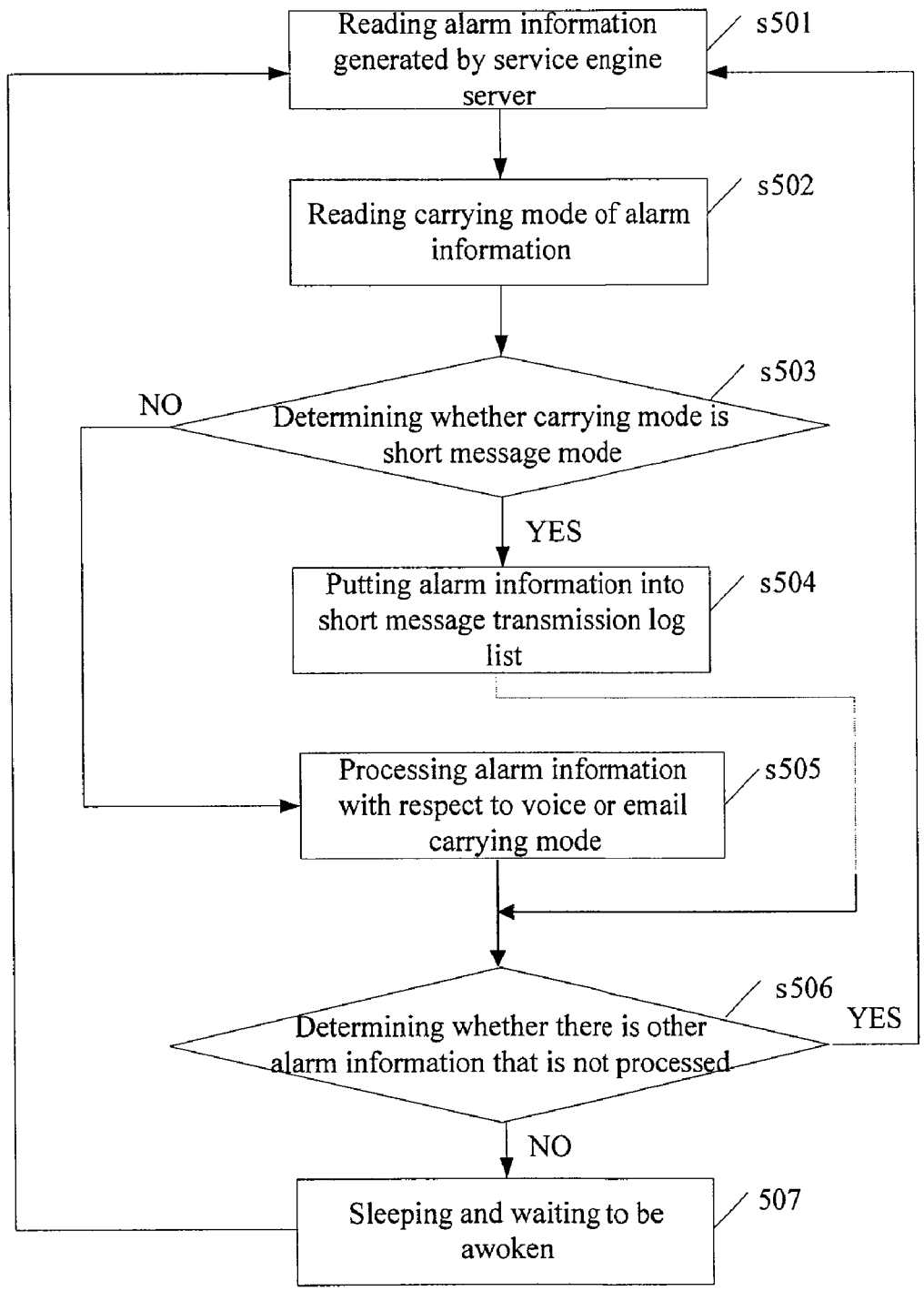
FIG. 5 is a schematic diagram showing a processing method of an alarm server according to an embodiment of the invention.

Referring to FIG. 4, the flow of the service engine server mainly includes the following steps.

In step s401, the GTP signaling whose PDP is not activated is read.

In step s402, a guide strategy is read; the guide strategy may be stored in a data storage device; the guide strategy can be realized through configuring guide period, carrying mode, response sensitivity, effective time of one success guide, content template of the guide etc. via the human-machine interface of the control station, wherein the manager may customize the format and content of the guide information through the content template of the guide and in addition, the system may analyze the template and the content according to a template language engine and generate the guide information.

In step s403, it is determined whether this PDP activation needs to be guided and if yes, step s404 is performed; otherwise, step s405 is performed.

In step s404, the guide information is generated.

In step s405, the alarm strategy information is read and this alarm strategy information may be stored in a data storage device.

In step s406, it is determined whether an alarm needs to be generated for this PDP activation and if yes, step s407 is performed; otherwise, step s408 is performed.

In step s407, alarm information is generated according to the alarm strategy and the generation of the alarm strategy may be the same with the above generation of the guide strategy.

In step s408, it is determined whether there is other alarm strategy that is not performed and if yes, step s405 is performed; otherwise, step s409 is performed.

In step s409, it is determined whether there is other GTP signaling that is not performed and if yes, step s401 is performed; otherwise, step s410 is performed.

In step s410, the service engine server is in the sleeping state and waits to be awoken to perform step s401.

Referring to FIG. 5, the processing flow of the alarm server mainly includes the following steps.

In step s501, the alarm information generated by the service engine server is read.

In step s502, the carrying mode of the alarm information is read.

In step s503, it is determined whether the carrying mode is the short message mode and if yes, step s504 is performed; otherwise, step s505 is performed.

In step s504, the alarm information is put into the short message transmission log list.

In step s505, the alarm information is processed with respect to the voice or email carrying mode.

In step s506, it is determined whether there is other alarm information that is not processed and if yes, step s501 is performed; otherwise, step s507 is performed.

In step s507, the alarm server is in the sleep state and waits to be awoken to perform step s501.

2. When the user needs to obtain the indication information indicating whether this PDP is activated, the GGSN server may send the indication information indicating the refuse of the PDP activation to the user when it determines that the PDP is not activated.

3. A database server may provide corresponding functions of the data transfer between different devices and data storage. When a human-machine interface is needed to perform the system operation configurations, a control station server may still be used to perform the guide strategy configuration, alarm strategy configuration, user management, system performance monitoring and statistic analysis etc. to facilitate the system to achieve the guide of the PDP activation, wherein a monitoring server may realize the performance monitoring of different devices in the system.

The system (taking GPRS system as an example) guiding the PDP activation according to the embodiment of the invention will be described with reference to the accompanying drawings.

Figure 6:
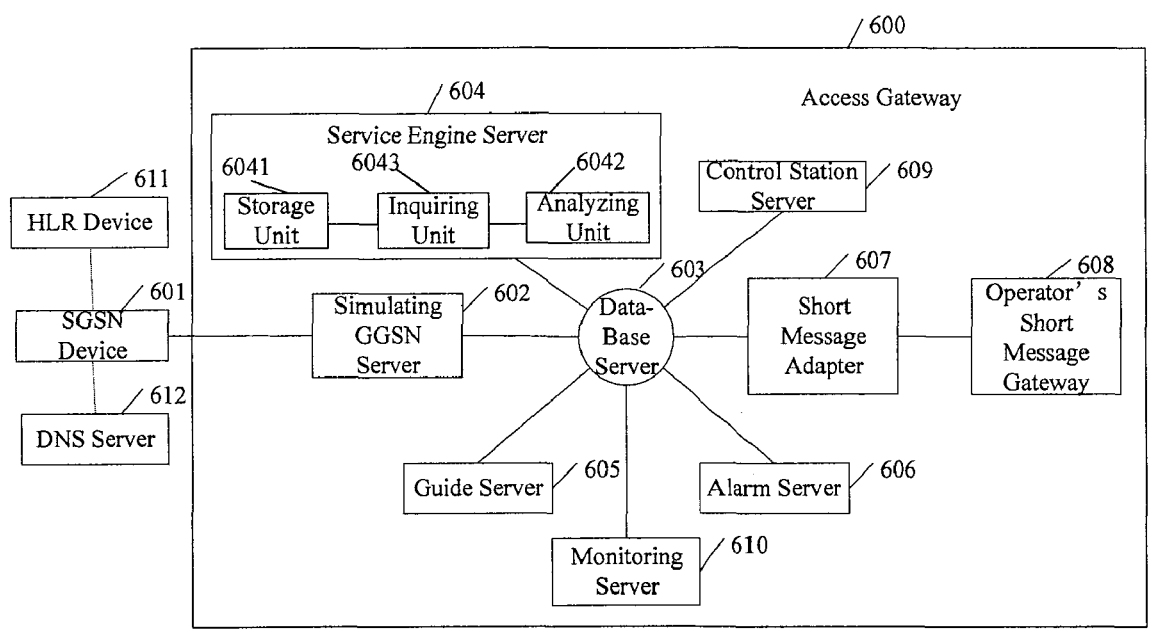
FIG. 6 is a schematic diagram showing a system for guiding the packet data protocol activation according to an embodiment of the invention.

FIG. 6 is a schematic diagram showing the GPRS system according to the embodiment of the invention. As shown in FIG. 6, the GPRS system mainly includes a Domain Name System (DNS) server 612, a HLR device 611, a SGSN device 601 and an access gateway 600, wherein the access gateway 600 further includes a simulating GGSN server 602, a database server 603, a service engine server 604, a guide server 605, an alarm server 606, a short message adapter 607, an operator short message gateway 608, a control station server 609 and a monitoring server 610. The above devices of the gateway may be integrated in the access gateway 600 and may be used independently, as long as the corresponding functions of the above devices are realized. The service engine server 604 further includes a storage unit 6041, an analyzing unit 6042 and an inquiring unit 6403, wherein the connections and the functions of the devices and units are as follows.

The SGSN device 601 is connected with the simulating GGSN server 602, the DNS server 612 and the HLR device 611; the short message adapter 607 is connected with the operator short message gateway 608; the simulating GGSN server 602, the service engine server 604, the guide server 605, the alarm server 606, the control station server 609 and the monitoring server 610 are all connected with the database server 603; and the storage unit 6041 and the analyzing unit 6042 are both connected with the inquiring unit 6043.

The database server 603 is connected with respective devices in the GPRS system and transfers information flows of respective devices. The database server 603 may also store the guide strategy and/or the alarm strategy, wherein the guide strategy may include the guide period, the carrying mode, the response sensitivity, the effective time of one success guide, the content template of the guide etc., the guide strategy may be realized through the human-machine interface of the control station and similarly the alarm strategy may be realized through the human-machine interface of the control station.

The SGSN device 601 performs a series of configurations for the DNS server of the GPRS bone network so that the PDP activation request with wrong APN setting may be provided to the simulating GGSN server 602 by the SGSN device 601, to thereby realize the provision process.

The simulating GGSN server 602 listens to the GTP information whose PDP carrying the APN information is not activated after receiving the PDP activation request provided by the SGSN device 601 so as to determine whether this PDP is activated. When the simulating GGSN server 602 has listened that there is the GTP signaling whose PDP is not activated, it determines that this PDP is not activated and stores the received GTP signaling in the database server 603, wherein two kinds of signaling of GTPv0 and GTPv1 of the GTP tunneling protocol may be considered during the listening and the listening may be realized through extracting the GTP signaling flag byte, determining the GTP signaling version, extracting the GTP signaling head, extracting the GTP signaling body, setting the reason code etc., and the survival of the listening service thread of the GTP can be detected according to the actual fact.

The service engine server 604 obtains the GTP signaling from the database server 603, analyzes the GTP signaling whose PDP is not activated, obtains the APN reason information causing the PDP not activated and the mobile station user information and thus obtains the guide information configured with respect to this activation. In addition, the guide information and/or alarm information may be generated according to the guide strategy and/or the alarm strategy configured in the database server 603. The service engine server 604 includes a storage unit, an analyzing unit and an inquiring unit.

The storage unit is for storing an associating database associating the APN reason information causing the PDP not activated with the guide information.

The analyzing unit is for analyzing the GTP signaling whose PDP is not activated, analyzing for the APN reason information causing the PDP not activated and generating an object corresponding to the Message Type Field in the GTP signaling, wherein the analyzing unit can obtain the mobile station user information and the alarm information indicating the PDP is not activated by analyzing the GTP signaling.

The inquiring unit is for inquiring the associating database stored by the storage unit according to the APN reason information and the mobile station user information obtained by the analyzing unit and for obtaining the guide information for guiding the user to properly set the APN information for this PDP activation.

The guide server 605 is for configuring the corresponding carrying mode for the guide information according to the guide information obtained by the service engine server 304 and according to the carrying mode set of the guide information introduced in by itself, wherein the carrying modes include the short message mode, the voice communication mode, the email mode etc., and the optimal one can be selected according to whether the adaptation is easy.

The alarm server 606 is for configuring the corresponding carrying mode for the alarm information obtained by the analyzing unit 6042 according to the carrying mode set of the alarm information introduced in by itself, wherein the carrying modes include the short message mode, the voice communication mode, the email mode etc., and the optimal one can be selected according to whether the adaptation is easy.

The short message adapter 607 is connected with the operator's short message gateway 608 for cooperatively transmitting the obtained guide information to the user side through the short message mode and can transmit the obtained alarm information to the manager in the short message mode.

The control station server 609 is for performing the guide strategy configuration, the alarm strategy configuration, the user management, the system performance monitoring and the statistic analysis etc. to facilitate the system to achieve the guide of the PDP activation.

The monitoring server 610 is for monitoring the system performance of the simulating GGSN server 602, the service engine server 604, the guide server 605 and the alarm server 606 etc. in the system and for returning the corresponding monitoring data.

The following three points needs to be noted.

A. The devices or functions related with the generation and transmission of the alarm message may be added or deleted according to the practice. For example, when the manager or the management device at the management side needs to obtain the alarm information that the PDP is not activated, the devices or functions related with the generation and transmission of the alarm message may be added and these devices or functions can be deleted when not necessary, wherein these devices or functions related with the generation of the alarm message can be on the alarm server 606 and the service engine server and these devices or functions related with the transmission of the alarm message can be on the short message adapter 607 and the operator's short message gateway 608.

B. The control station server 609 and the monitoring server 610 may be added or deleted according to the practical need of the system configuration.

C. When the adopted carrying mode of the guide information or the alarm information is not the short message mode, but such as the OTA mode, the email mode, the voice communication mode etc., the adopted transmission control device for the guide information or alarm information can be changed accordingly. This belongs to the related art and will not be described in detail here.

The embodiments of the invention provide a method and system for guiding the PDP activation. When the PDP is not activated, the APN information causing the PDP not activated is analyzed, the resulting guiding information for guiding the user to properly set the APN is obtained and output to the user, to thereby properly guide the user to properly set the APN, to have the requested service accessed and provisioned and thus improve the communication service quality.

The above are only the preferred embodiments of the invention. It is noted that to those skilled in the art, various improvements and modifications may be made without departing from the principle of the invention and also fall into the protection scope of the invention.

What is claimed is:

1. A method for guiding a packet data protocol activation, comprising:
   determining whether a packet data protocol is activated and if the determination result indicates that the packet data protocol is not activated because of including a wrong service access point name, analyzing service access point name information causing the packet data protocol not activated;
   introducing in an associating database for associating service access point name reason information causing the packet data protocol not activated with guide information for properly setting the service access point name;
   inquiring the associating database based on the service access point name reason information obtained by the analyzing and obtaining the guide information for guiding a user to properly set the service access point name; and
   transmitting the guide information for guiding the user to properly set the service access point name to the user side.

2. The method for guiding the packet data protocol activation according to claim 1, wherein if the determination result indicates that the packet data protocol is not activated, before analyzing the service access name information causing the packet data protocol not activated, the method further comprises a step of listening to a signaling carrying the service access point name information causing the packet data protocol not activated.

3. The method for guiding the packet data protocol activation according to claim 2, wherein analyzing the service access name information causing the packet data protocol not activated comprises:
   obtaining the service access name reason information causing the packet data protocol not activated and mobile station user information by analyzing the signaling.

4. The method for guiding the packet data protocol activation according to claim 1, further comprising:
   introducing in a carrying mode set of the guide information; and
   transmitting the guide information for guiding the user to properly set the service access point name to the user side by a carrying mode of the guide information.

5. The method for guiding the packet data protocol activation according to claim 2, further comprising:
   analyzing the signaling to obtain alarm information indicating the packet data protocol is not activated;
   introducing in a carrying mode set of the alarm information; and
   transmitting the alarm information to a management side by a carrying mode of the alarm information.

6. The method for guiding the packet data protocol activation according to claim 4, wherein the carrying mode of the guide information is one of a short message mode, an Over the Air mode, a voice communication mode and an email mode.

7. The method according to claim 5, wherein the carrying mode of the alarm information is a short message mode, an Over the Air mode, a voice communication mode or an email mode.

8. A system for guiding a packet data protocol activation, comprising:
   an access gateway, for generating guide information for guiding a user to properly set a service access point name to thereby control a transmission of the guide information to the user side before an activation of a packet data protocol, wherein
   the access gateway further comprises:
   a simulating GGSN server, for obtaining an activation request signaling and when determining the packet data protocol is not activated, for outputting service access point name information causing the packet data protocol not activated;
   a service engine server, for generating the guide information for guiding the user to properly set the service access point name by analyzing the service access point name information; and
   a transmission control device, for controlling the transmission of the guide information to the user side.

9. The system for guiding the packet data protocol activation according to claim 8, wherein the simulating GGSN server comprises a listening module, for listening to a signaling carrying the service access point name information causing the packet data protocol not activated.

10. The system for guiding the packet data protocol activation according to claim 8, wherein the service engine server comprises:
   a storage unit, for storing an associating database for associating the service access point name reason information causing the packet data protocol not activated with the guide information;
   an analyzing unit, for obtaining the service access name reason information causing the packet data protocol not activated and mobile station user information by analyzing the signaling; and
   an inquiring unit, for inquiring the associating database based on the service access point name reason information and the mobile station user information obtained by the analyzing unit to thereby obtain the guide information for guiding the user to properly set the service access point name.

11. The system for guiding the packet data protocol activation according to claim 8, further comprising at least one of the following servers:
   an alarm server, for configuring a carrying mode of alarm information before the transmission control device controls the transmission of the alarm information to a management side;
   a guide server, for configuring a carrying mode of the guide information before the transmission control device controls the transmission of the guide information to the user side;
   a control station server, for providing a human-machine interactive interface for guiding the packet data protocol activation for the system;
   a monitoring server, for monitoring system performances of respective devices in the system; and
   a database server, connected with the respective devices in the system and for transferring information streams of the respective devices.

12. An access gateway for generating guide information for guiding a user to properly set a service access point name to thereby control a transmission of the guide information to the user side before an activation of a packet data protocol, comprising:
   a simulating GGSN server, for obtaining an activation request signaling and when determining the packet data protocol is not activated, for outputting service access point name information causing the packet data protocol not activated;
   a service engine server, for generating the guide information for guiding the user to properly set the service access point name by analyzing the service access point name information; and
   a transmission control device, for controlling the transmission of the guide information to the user side.

13. The access gateway according to claim 12, wherein the simulating GGSN server comprises a listening module, for listening to a signaling carrying the service access point name information causing the packet data protocol not activated.

14. The access gateway according to claim 12, wherein the service engine server comprises:
   a storage unit, for storing an associating database for the service access point name reason information causing the packet data protocol not activated and the guide information;
   an analyzing unit, for obtaining the service access name reason information causing the packet data protocol not activated and mobile station user information by analyzing the signaling; and
   an inquiring unit, for inquiring the associating database based on the service access point name reason information and the mobile station user information obtained by the analyzing unit to thereby obtain the guide information for guiding the user to properly set the service access point name.

15. The access gateway according to claim 12, further comprising at least one of the following servers:
   an alarm server, for configuring a carrying mode of alarm information before the transmission control device controls the transmission of the alarm information to a management side;
   a guide server, for configuring a carrying mode of the guide information before the transmission control device controls the transmission of the guide information to the user side;
   a control station server, for providing a human-machine interactive interface for guiding the packet data protocol activation for the system;
   a monitoring server, for monitoring system performances of respective devices in the system; and
   a database server, connected with the respective devices in the system and for transferring information streams of the respective devices.

* * * * *